UNITED STATES PATENT OFFICE 2,591,191

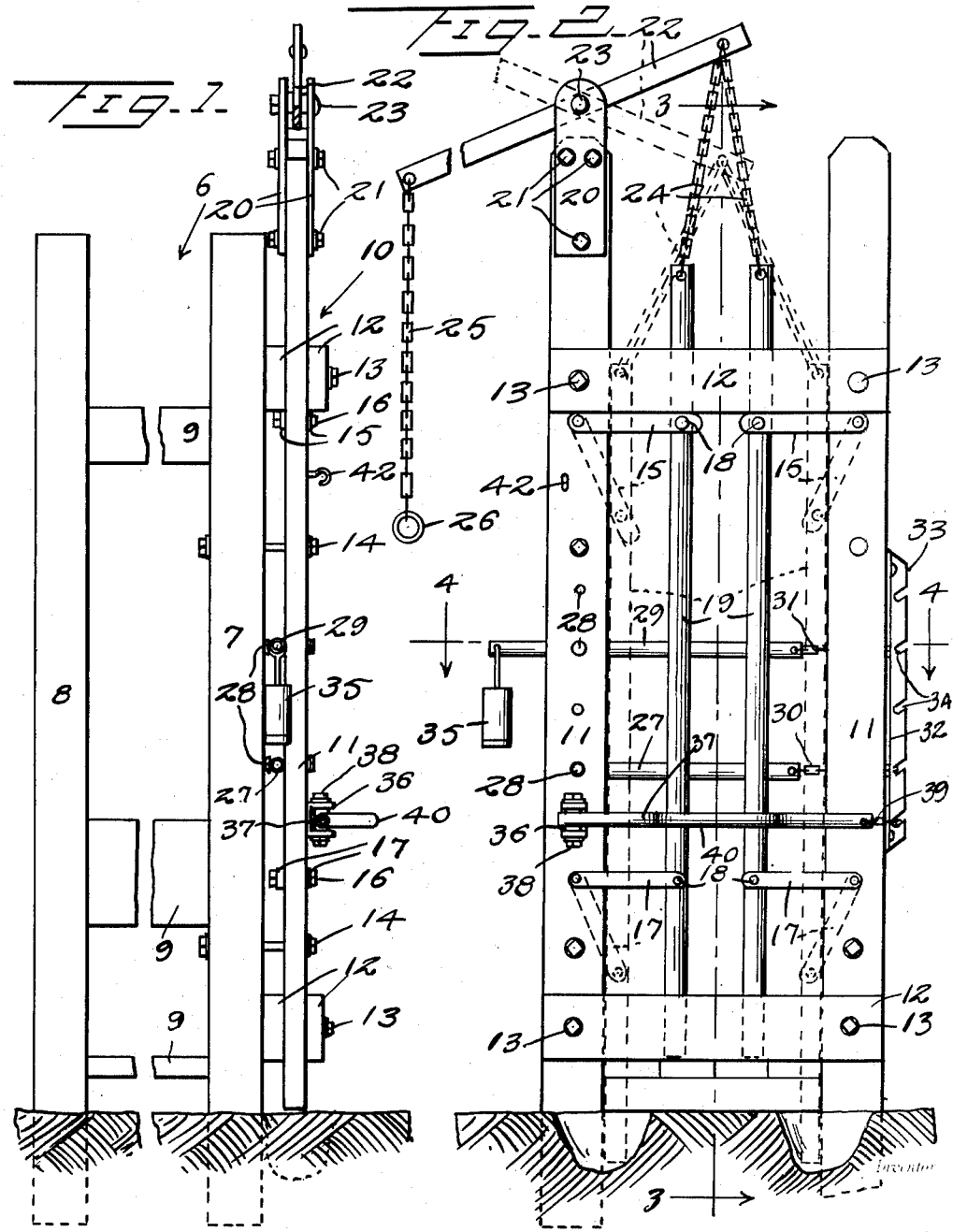

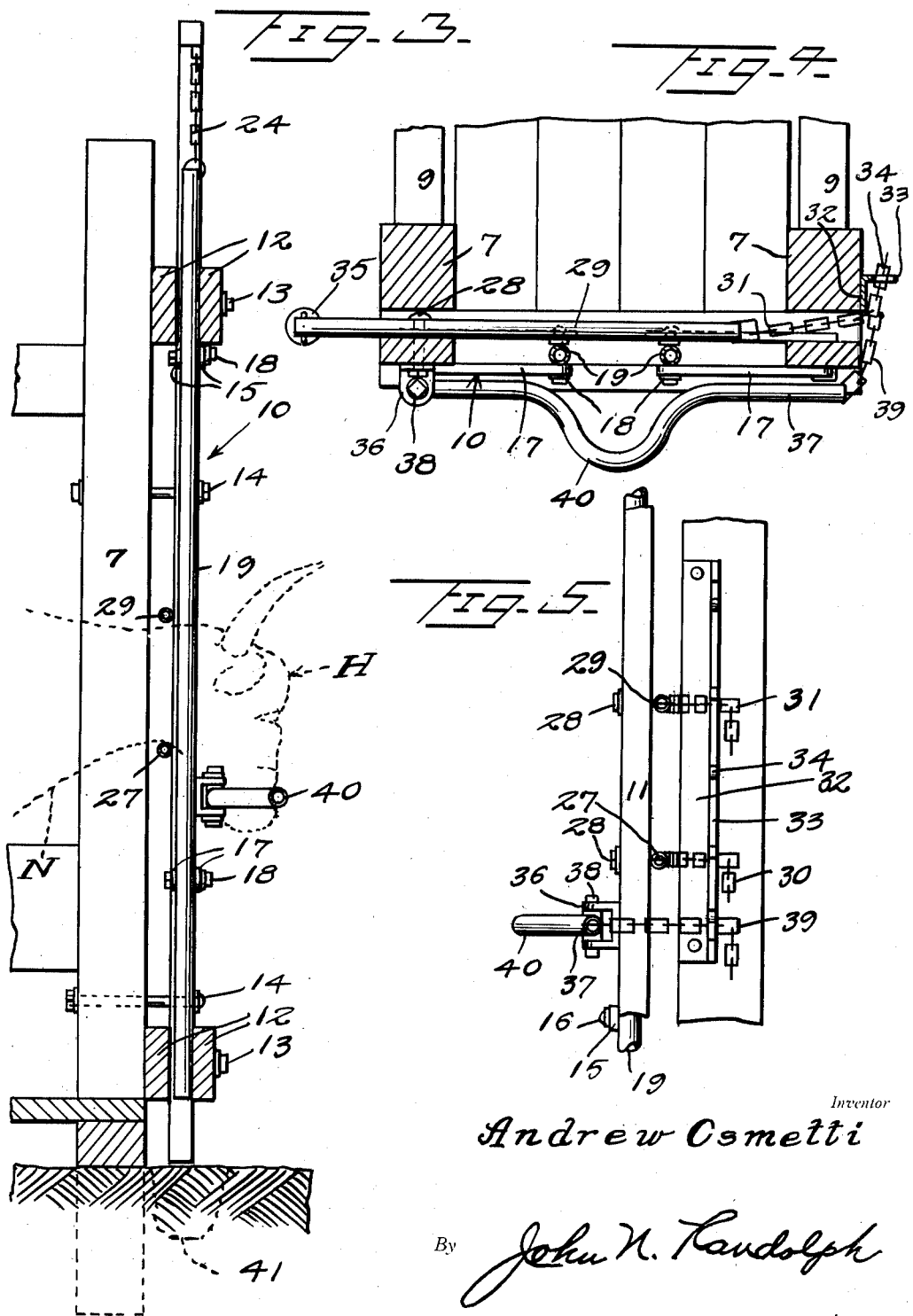

BRANDING AND DEHORNING CHUTE FOR CATTLE

Andrew Osmetti, Beckworth, Calif.

Application May 4, 1951, Serial No. 224,601

8 Claims. (Cl. 119—99)

This invention relates to a novel construction of branding and dehorning chute of the type wherein the cow or steer may enter the chute through its open rear end and after completion of the branding or dehorning operation or both, the steer or cow may walk forward from the chute through the forward end thereby making it much easier to empty the chute than where it is necessary, as in conventional chutes, to back the cow or steer out through the open rear end of the chute.

More particularly, it is an aim of the present invention to provide a chute having means at the forward end thereof to engage the neck and face of a cow or steer and to thus form a temporary closure to prevent the escape of the steer forwardly through the front of the chute and likewise prevent the steer from backing away from the forward end of the chute until after the necessary branding and/or or dehorning operations have been completed.

Still a further object of the invention is to provide a chute having connected face engaging means at its forward end for holding the head of a cow or steer substantially immobile to thereby substantially immobilize the animal while a branding operation is being performed on it and for completely immobilizing the head while the horns are being cut off.

Still a further object of the invention is to provide a chute wherein the animal head engaging means may be released by operators disposed at opposite sides of the chute to thereby eliminate risk of injury to the operators when the forward end of the chute is opened and the animal thus released and which might otherwise occur where a frightened animal charges out of the forward end of the chute after being released therefrom.

Various other objects and advantages of the invention will hereinafter become more fully apparent from the following description of the drawings, illustrating a presently preferred embodiment thereof, and wherein:

Figure 1 is a fragmentary side elevational view of a chute constructed in accordance with the invention;

Figure 2 is a front elevational view of the same;

Figure 3 is a fragmentary longitudinal vertical section view taken substantially along a plane as indicated by the line 3—3 of Figure 2;

Figure 4 is a horizontal sectional view of the forward end of the chute taken substantially along a plane as indicated by the line 4—4 of Figure 2, and Figure 5 is a fragmentary side elevational view looking from right to left of Figure 2.

Referring more specifically to the drawings, the dehorning and branding chute in its entirety is designated generally 6 and includes four corner posts including two front corner posts 7 and two rear corner posts 8, only one of which posts 8 has been shown, and which posts 7 and 8 are anchored in the ground and disposed in upright positions. The aligned front and rear corner posts 7 and 8 are connected by a plurality of bars or slats 9 of a suitable number to prevent an animal such as a cow or steer from escaping through a side of the chute 6 and which are spaced apart so that access will be readily afforded to the sides of the animal while in the chute for the purpose of branding the animal or for other operations to be performed thereon. The chute 6 is of a conventional type at its rear being open between its rear corner posts 8 to allow an animal to be led into the chute through its open rear end and toward its forward end and the chute may be of any desired length, preferably somewhat longer than the length of a steer.

A novel feature of the present invention relates to an improved construction of stanchion, designated generally 10 and forming an addition to the conventional portion of the chute as constituted by the parts 7, 8 and 9. The stanchion 10 includes a pair of upright anchor posts 11 which are spaced apart a distance corresponding to the space between the front corner posts 7 and which are connected in properly spaced relationship adjacent their upper and lower ends by pairs of stretcher bars 12 between the ends of which the anchor posts are disposed. One stretcher bar 12 of each of the pairs is disposed with its ends between the anchor posts 11 and the front corner posts 7 to additionally function as a spacing member for spacing the anchor posts from the front corner posts, as best illustrated in Figure 1. Bolts or other suitable fastenings 13 extend through the complementary ends of each pair of stretcher bars 12 and through portions of the anchor posts engaged thereby and said fastenings 13 are anchored in the front corner posts 7 for securing the stanchion 10 thereto. Each front corner post 7 and the adjacent anchor post 11 are also preferably connected by a plurality of nut and bolt fastenings 14 which are disposed between the bars 12. A pair of links 15 are connected at corresponding ends thereof to each anchor post 11 beneath and adjacent the upper bars 12 by a nut and bolt fastening 16 on which said links are swingably mounted for vertical swinging movement and the individual links of each pair of links are supported in spaced substantially parallel relationship by the anchor post 11 which is disposed between said links. A lower pair of links 17 is similarly connected by a fastening 16 to each anchor post 11 and substantially above the lower stretcher bars 12. The opposite ends of the pairs of links 15 and 17 which are connected to each anchor post 11 are pivotally connected by fastenings 18 to a rod or pipe 19, which rods are disposed between the anchor posts 11 and each of which rods are disposed between complementary ends of the links 15 and 17 connected thereto. The rods or pipes 19 have end portions disposed above and beneath the links 15 and 17 which extend loosely through the spaces between the upper and lower pairs of bars 12 and in which said end portions of the rods 19 are guided for movement vertically and laterally of the stanchion 10, as will hereinafter become apparent.

A pair of strap members 20 is secured by a fastening 21 to the upper portion of one of the anchor posts 11 and said strap members have upper ends extending above the upper end of said anchor post for loosely receiving therebetween the intermediate portion of a lever 22 which is pivotally supported between the straps 20 by a fastening 23 which extends loosely through said lever and is anchored adjacent its ends in the upper portions of the straps 20. The lever 22 has an inner end disposed substantially centrally above the stanchion 10 and which is connected by flexible members such as chains 24 to the upper ends of the rods 19. A chain 25 or other flexible member is connected to and depends from the opposite end of the lever 22 and which is disposed outwardly of one side edge of the stanchion 10. The chain 25 preferably has a ring 26 at its lower end.

A throat engaging rod 27 has one end disposed between one anchor post 11 and the adjacent corner post 7 and is swingably connected to said posts by a fastening 28 which extends through said end and is anchored in said posts 7 and 11. A neck engaging bar 29 is swingably mounted by another fastening 28 on the same posts 7 and 11 and above the bar 27 and near to but spaced from one end of said bar 29. A chain 30 is connected at one end to the opposite end of the bar 27 and a chain 31 is connected at one end to the end of the bar 29 located remote to its pivot 28, said chains 30 and 31 extending outwardly between the other front corner post 7 and anchor post 11 when the bars 27 and 29 are in substantially horizontal positions, as illustrated in Figure 2. An elongated metal strip or plate 32 is secured to the outer side of the last mentioned corner post 7 and has an outwardly projecting vertically disposed flange 33 provided with a plurality of inclined slots 34 having upper ends opening outwardly of the outer edge of the flange 33. The slots 34 selectively receive links of the chains 30 and 31 and a link of each chain disposed beyond the link which engages a slot 34 is disposed crosswise of said slot and forms a stop to prevent the chain from being drawn lengthwise through the slot to thereby anchor the chain to the flange 33 to maintain the bars 27 and 29 in substantially horizontal positions. The opposite, shorter end of the bar or rod 29 which is disposed outwardly of the stanchion 10 has a weight 35 suspended therefrom. Accordingly, it will be readily apparent that when the chains 30 and 31 are disengaged from the slots 34, the throat engaging rod 27 will swing downwardly on its pivot substantially into the space between the posts 7 and 11 on which the rod 27 is supported and when the chain 31 is disengaged from the flange 33 the weight 35 will cause the longer end of the rod 29 to swing upwardly and toward an upright position.

A bracket 36 is mounted in an upright position on the outer side of the post 11, engaged by the fastenings 38, and is disposed beneath the lower fastening 28 which swingably supports the throat rod 27. One end of a nose or face engaging bar 37 is disposed in the bracket 36 and swingably connected thereto for swinging movement in a horizontal plane by means of the vertically disposed fastening 38. A chain 39 has one end connected to the opposite end of the bar 37 and is detachably anchored in one of the slots 34 to hold the bar 37 in its position of Figures 1 and 2 across the front of the stanchion 10. As best seen in Figures 3 and 4, the bar 37 is provided with an outwardly bowed intermediate portion 40 which projects away from the front of the stanchion 10 and which is adapted to receive and engage over the nose or lower portion of the face of a cow or steer, the head of which is shown in Figure 3 at H.

Assuming that the chains 30, 31 and 39 are disengaged from the flange 33, the rods 27 and 29 will be disposed in substantially vertical positions as previously described and the bar 37 may be swung away from the front of the stanchion 10. Likewise, if the lever 22 is released the weight of the rods or pipes 19 will cause said elements to move downwardly and as a result the pairs of links 15 and 17 will swing downwardly so that the rods or pipes 19 will be displaced by gravity downwardly and outwardly to their dotted line positions of Figure 2 and the lever 22 and chains 24 will likewise be moved thereby to the dotted line positions of said parts as seen in Figure 2. Holes or depressions 41 may be provided in the earth beneath the lower ends of the anchor posts 11 to accommodate the lower ends of the pipes 19 when said pipes are disposed in their dotted line, inoperative positions. With the parts thus disposed, as just previously described, it will be readily apparent that the stanchion 10 is completely open so that a cow or steer disposed in the chute 6 may walk forwardly from the chute through the stanchion 10, after which another cow or steer may be led into the chute through its open rear end and led forwardly until the head H of the animal is projecting from the open front of the stanchion 10 and the animal's neck N is disposed in the stanchion. Preferably, before the animal is led into the chute the throat engaging bar 27 is swung back to its horizontal position of Figure 2 and the chain 30 thereof is engaged in one of the slots 34 so that as the animal is led forwardly through the chute its head will pass through the stanchion over the throat engaging bar 27 and which will thus function to prevent the animal from walking on forwardly through the stanchion. The chain or flexible member 25 is then grasped and pulled downwardly to swing the lever 22 counterclockwise on its pivot 23 to elevate the pipes 19. The links 15 and 17 will cause the pipes 19 to be displaced toward one another as they move upwardly so that the neck N of the animal will then be disposed between the pipes 19. By pulling on the chain 31, the longer end of the neck engaging rod 29 may then be swung downwardly to its horizontal position of Figure 2 to engage over the top of the neck of the animal and may be retained in this position by engaging the chain 31 with one of the slots 34. The pipes 19 are held in their adjacent full line positions with the links 17 in substantially horizontal planes, preferably by attaching the ring 26 of the chain 25 to a hook 42 which is anchored in the post 11 on which the lever 22 is swingably supported. With the parts 19, 27 and 29 disposed as seen in Figure 2, the animal is held against movement to any considerable extent either forwardly or rearwardly of the chute and stanchion but in order to hold the animal with its head H immobile and with its body substantially immobile, the nose bar 37 is then swung to a position across the front of the stanchion 10 and the chain 39 connected to the flange 33 so that the outwardly bowed intermediate nose engaging portion 40 of the bar 37 will engage over the face or nose of the animal to thus hold the head immobile and the body substantially immobile so that the horns of the animal may be cut off, a brand may be applied to the body of the animal or any other desired operation may be performed on the animal. The chain 39 is first released and the bar 37 is swung away from the open front of the stanchion 10, after which the chains 39 and 31 are released from the flange 33 to allow the bars 27 and 29 to assume substantially vertical position. The ring 26 is then disengaged from the hook 42 and released so that the pipes 19 may swing to their dotted line positions of Figure 2 to thus completely expose or open the stanchion 10 to permit the animal to walk forwardly therethrough and out of the chute.

Various modifications and changes are contemplated and may obviously be resorted to, without departing from the spirit or scope of the invention as hereinafter defined by the appended claims.

I claim as my invention:

1. The combination with a cattle chute having an open rear end and an open forward end and including front corner posts disposed in transversely spaced relationship relatively to the chute and defining its open forward end, of a stanchion having laterally spaced upright anchor posts, means securing each of the anchor posts to one of the front corner posts and supporting the anchor posts in front of and spaced from the front corner posts, a pair of upright neck engaging members disposed between the anchor posts in spaced relationship to one another, vertically spaced pairs of links connecting each of said neck engaging members to an adjacently disposed anchor post for vertical and lateral movement of the neck engaging members relatively to the anchor posts, said links being pivotally supported on the anchor posts for vertical swinging movement and being urged downwardly by gravity for displacing the neck engaging members downwardly and away from one another, manually actuated means including a lever fulcrumed intermediate of its ends on one of the anchor posts for displacing said neck engaging members upwardly and toward one another, a throat engaging member swingably connected at one end thereof to one of said anchor posts for vertical swinging movement, means for latching said throat engaging member in substantially a horizontal position between the anchor posts and across said upright neck engaging members when the latter are in elevated positions, a neck engaging rod pivotally supported for vertical swinging movement adjacent one end thereof on the last mentioned anchor post and above the pivot of said throat engaging member, means for latching said neck engaging rod in substantially a horizontal position with a portion thereof disposed between the anchor posts and extending across the upright neck engaging members to cooperate therewith and with a portion of the throat engaging member to define a neck receiving opening, and counter-weight means connected to the neck engaging rod and urging the end thereof disposed between the anchor posts to swing upwardly and toward the anchor post on which said rod is swingably supported.

2. A structure as in claim 1, said throat engaging member and neck engaging rod being disposed behind the upright neck engaging members, and stop means engaging certain of said links and limiting swinging movement of said links upwardly to prevent the links from swinging upwardly beyond horizontal positions.

3. A structure as in claim 1, said upright neck engaging members being disposed in front of the throat engaging member and neck engaging rod, and a nose engaging member swingably connected at one end thereof to one of said anchor posts for swinging movement in substantially a horizontal plane, means for latching the opposite end of said nose engaging member in a position across the outer sides of the anchor posts and across the upright neck engaging members and forwardly thereof, said nose engaging member being disposed below the throat engaging member when the latter is in substantially a horizontal position and having an outwardly offset arcuate intermediate portion adapted to engage across the face of an animal when the neck of the animal is engaged by the upright neck engaging members, the throat engaging member and neck engaging rod.

4. A stanchion for closing or exposing the open forward end of a cattle chute comprising a pair of spaced upright anchor posts disposed forwardly of and substantially in alignment with the sides of a cattle chute, a pair of upright neck engaging members disposed between said anchor posts, link means connecting each neck engaging member to the adjacent anchor post, said link means being supported for vertical swinging movement on the anchor posts, said neck engaging members being gravity urged downwardly and away from one another, manually actuated means for elevating the neck engaging members and for displacing said members toward one another, a throat engaging member connected for vertical swinging movement on one of the anchor posts, means for detachably latching said throat engaging member in substantially a horizontal position between the anchor posts and across the upright neck engaging members, said throat engaging member being urged downwardly by gravity to substantially a vertical position to one side of the opening defined by the anchor posts, a neck engaging rod swingably connected to the last mentioned anchor post above the connection of the throat engaging member thereto, means for latching said neck engaging rod in substantially a horizontal position across said upright neck engaging members and above the throat engaging member, and counter-weight means connected to the neck engaging rod and urging it to swing in the opposite direction to the throat engaging member whereby said upright neck engaging members, the throat engaging member and neck engaging rod are gravity urged when released to positions for exposing the stanchion opening defined by the anchor posts to permit an animal to pass therethrough.

5. A stanchion structure as in claim 4, and a nose engaging member swingably connected at one end thereof to one of said anchor posts for swinging movement in a horizontal plane, means for detachably latching said nose engaging member across the anchor posts, said nose engaging member being disposed across the outer side of the stanchion and outwardly of the anchor posts and upright neck engaging members when in a latched position, said upright neck engaging members being disposed in the plane of the anchor posts, and said neck engaging rod and throat engaging member being disposed behind the anchor posts and upright neck engaging members when in latched positions.

6. A stanchion as in claim 5, said nose engaging member having an outwardly bowed intermediate portion adapted to engage over the face of an animal when the neck of the animal is engaged in the opening formed by the upright neck engaging members, the throat engaging member and neck engaging rod.

7. A stanchion as in claim 4, bars connecting the anchor posts adjacent their upper and lower ends and combining therewith to define the stanchion opening, certain of said bars being disposed to be engaged by certain of the link means to prevent the link means from swinging upwardly beyond horizontal positions.

8. A stanchion as in claim 4, bars connecting the anchor posts adjacent their upper and lower ends and combining therewith to define the stanchion opening, certain of said bars being disposed to be engaged by certain of the link means to prevent the link means from swinging upwardly beyond horizontal positions, said last mentioned bars being arranged in pairs and being secured to opposite sides of the anchor posts to define guide slots therebetween in which the end portions of the upright neck engaging members are slidably disposed and guided for movement in a plane corresponding to the plane of the anchor posts.

ANDREW OSMETTI.

REFERENCES CITED

The following references are of record in the file of this patent:

UNITED STATES PATENTS

| Number | Name | Date |
|---|---|---|
| 646,251 | Young | Mar. 27, 1900 |
| 821,454 | Bidwell | May 22, 1906 |
| 1,805,405 | Kuhns | May 12, 1931 |
| 2,234,366 | Carter | Mar. 11, 1941 |
| 2,564,317 | Whitworth | Aug. 14, 1951 |